Figures 1, 2:
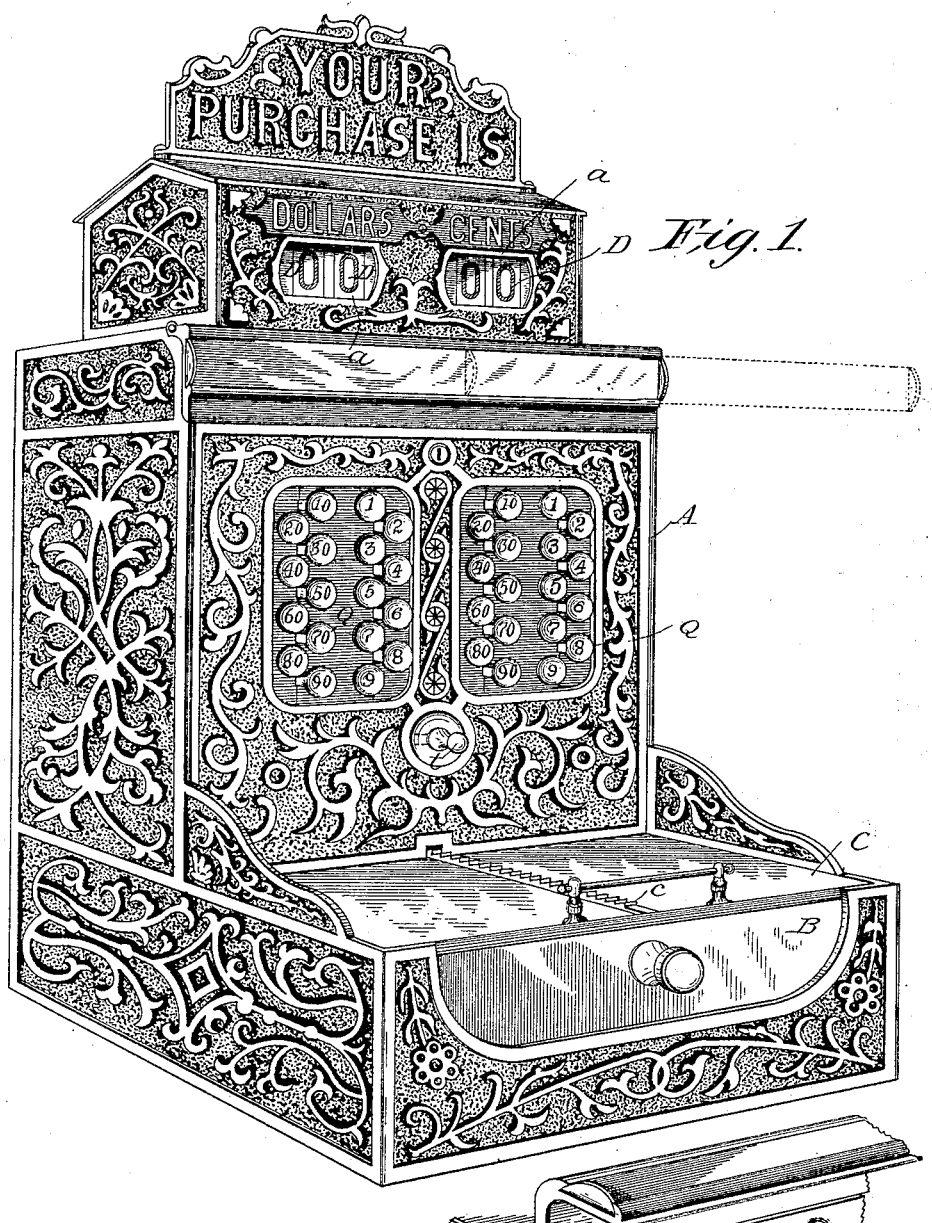

(No Model.)

A. B. HAYDEN.
CASH REGISTER AND INDICATOR.

No. 548,873. Patented Oct. 29, 1895.

11 Sheets—Sheet 1.

Witnesses
R. A. Balderson
Raymond S. Barnes

Inventor.
Austin B. Hayden
By Philip T. Dodge
His Attorney (No Model.) 11 Sheets—Sheet 2.
A. B. HAYDEN.
CASH REGISTER AND INDICATOR.
No. 548,873. Patented Oct. 29, 1895.
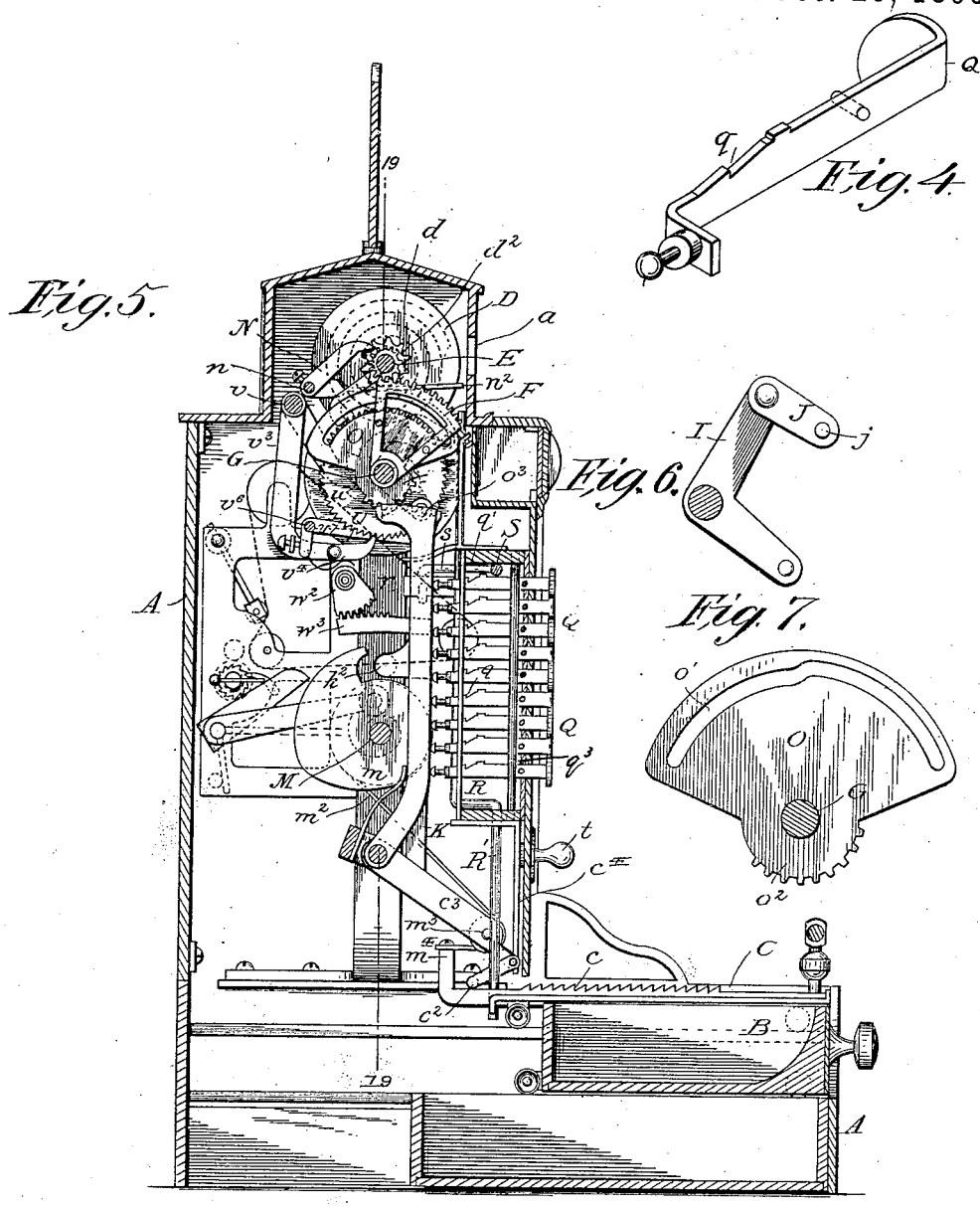
Witnesses:
R. A. Balderson
Raymond Barnes
Inventor:
Austin B. Hayden.
By Philip T. Dodge
His Attorney

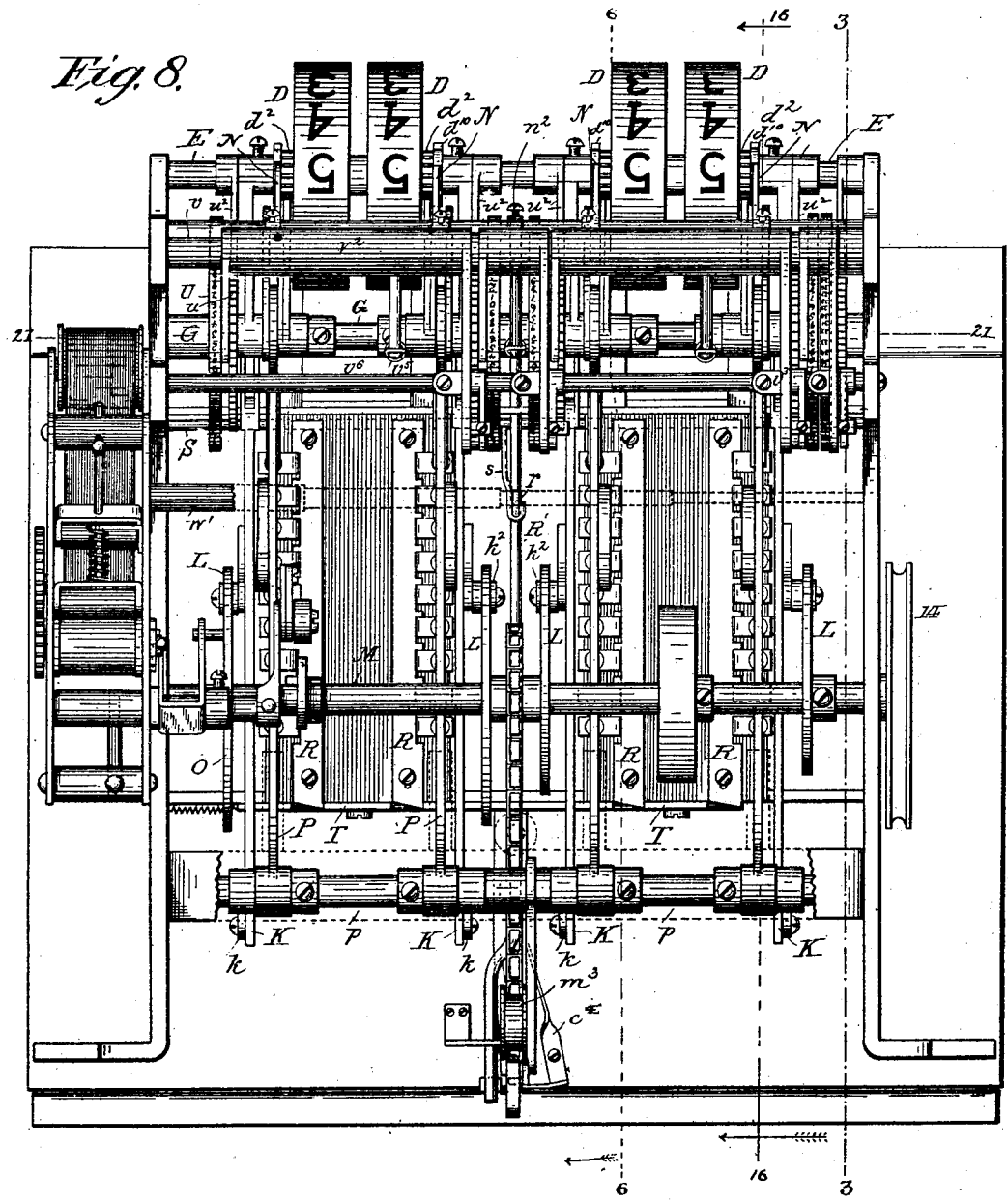

(No Model.)
11 Sheets—Sheet 4.

A. B. HAYDEN.
CASH REGISTER AND INDICATOR.

No. 548,873.                     Patented Oct. 29, 1895.

Witnesses:
R. A. Balderson.
Maymonat Barnes.

Inventor:
Austin B. Hayden.
By Philip T. Dodge
His Attorney.

(No Model.)  A. B. HAYDEN.  11 Sheets—Sheet 5.
CASH REGISTER AND INDICATOR.
No. 548,873. Patented Oct. 29, 1895.
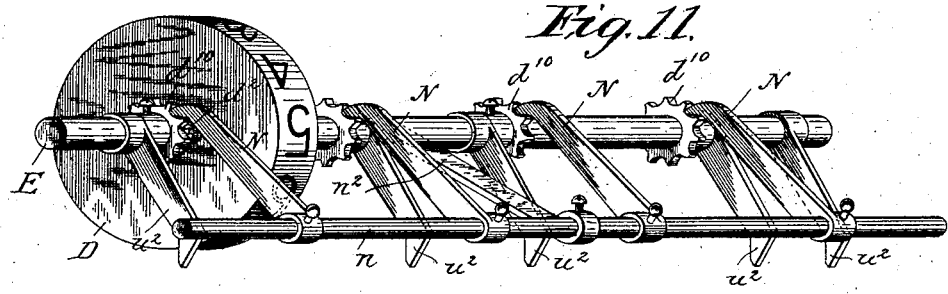
Fig. 11.
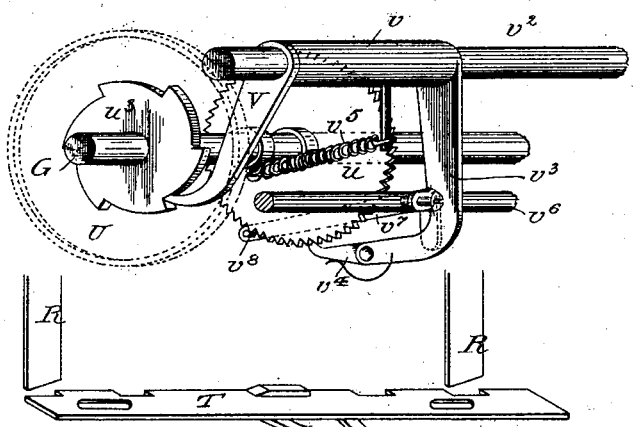
Fig. 12.
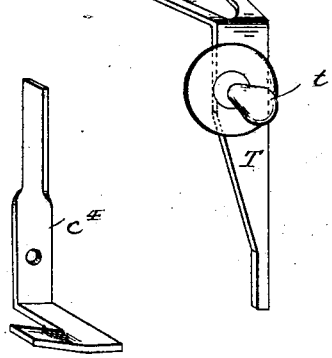
Fig. 13.
Fig. 14.
Witnesses
R. A. Balderson
Raymond F. Barnes
Inventor
Austin B. Hayden,
By: Philip T. Dodge
His Attorney (No Model.) 11 Sheets—Sheet 6.
A. B. HAYDEN.
CASH REGISTER AND INDICATOR.
No. 548,873. Patented Oct. 29, 1895.
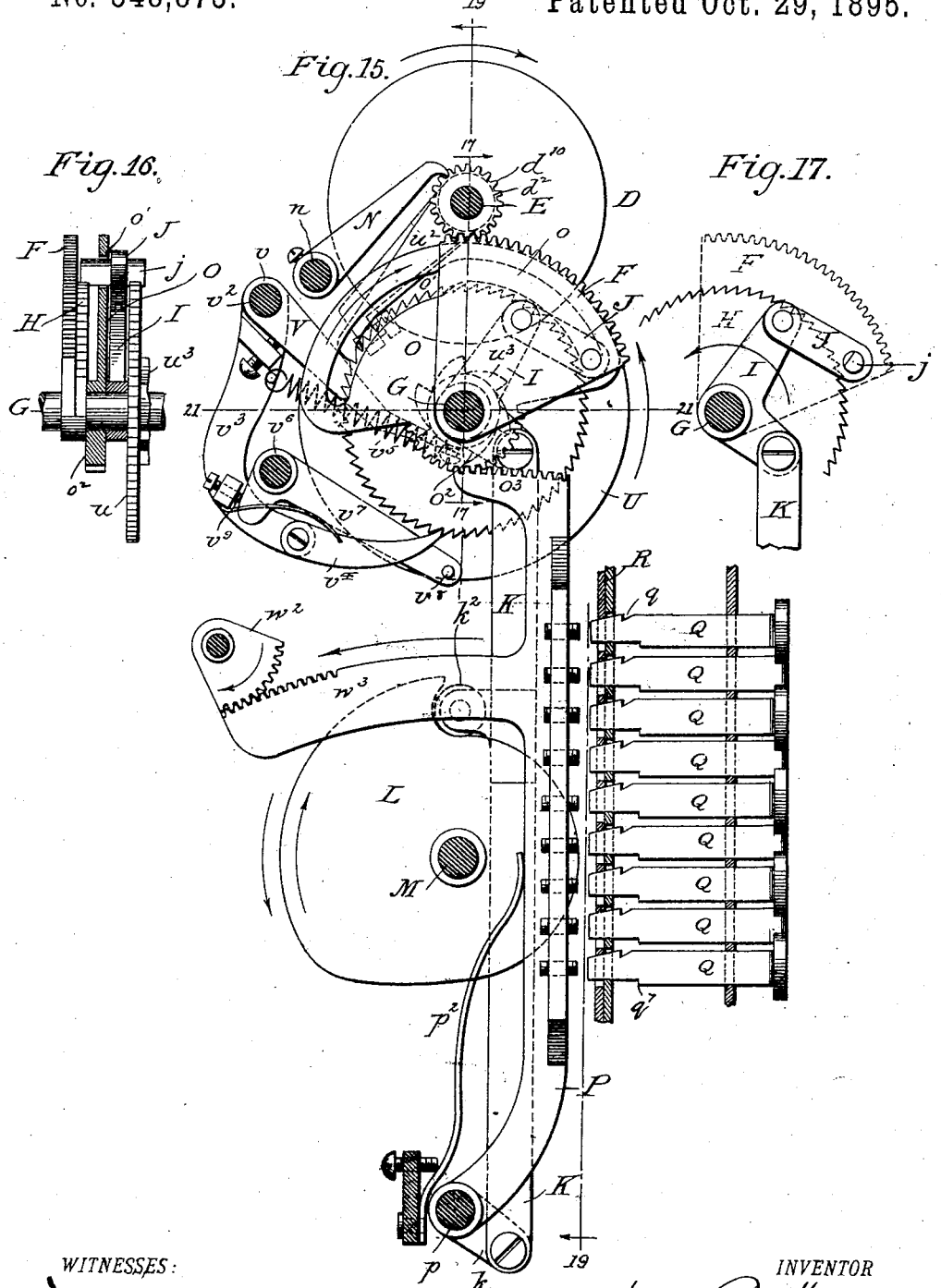
WITNESSES:
Raymond F. Barnes.
J. F. Elmore.
INVENTOR
Austin B. Hayden
BY
Philip F. Dodge
his ATTORNEY

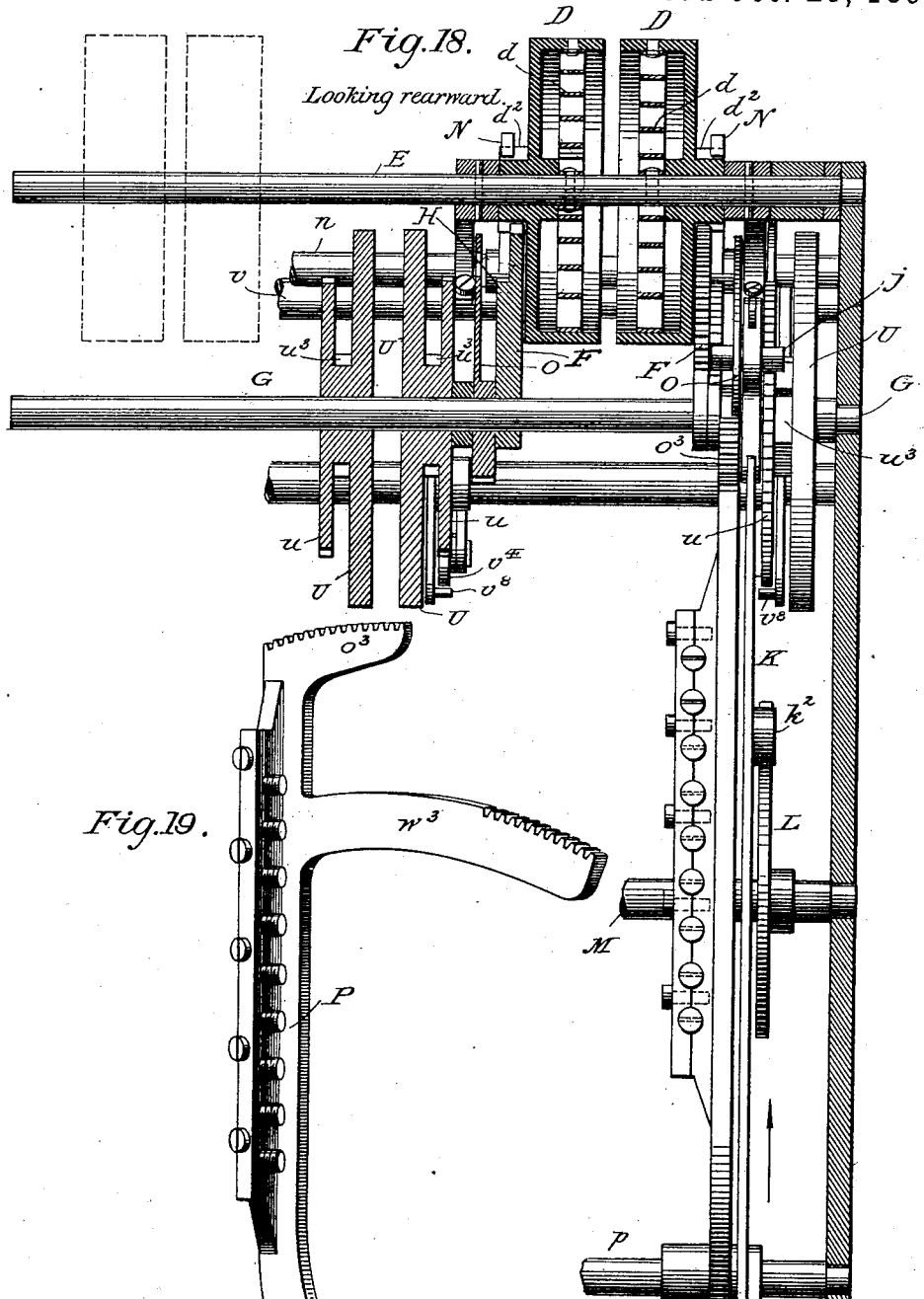

(No Model.)  11 Sheets—Sheet 8.
A. B. HAYDEN.
CASH REGISTER AND INDICATOR.
No. 548,873.  Patented Oct. 29, 1895.

on line 21–21.

WITNESSES:  INVENTOR
Raymond F. Barnes  Austin B. Hayden
  BY
  Philip T. Dodge
  his ATTORNEY (No Model.)  11 Sheets—Sheet 9.

A. B. HAYDEN.
CASH REGISTER AND INDICATOR.

No. 548,873.  Patented Oct. 29, 1895.

WITNESSES:

INVENTOR
Austin B Hayden
BY
Philip T. Dodge
ATTORNEY

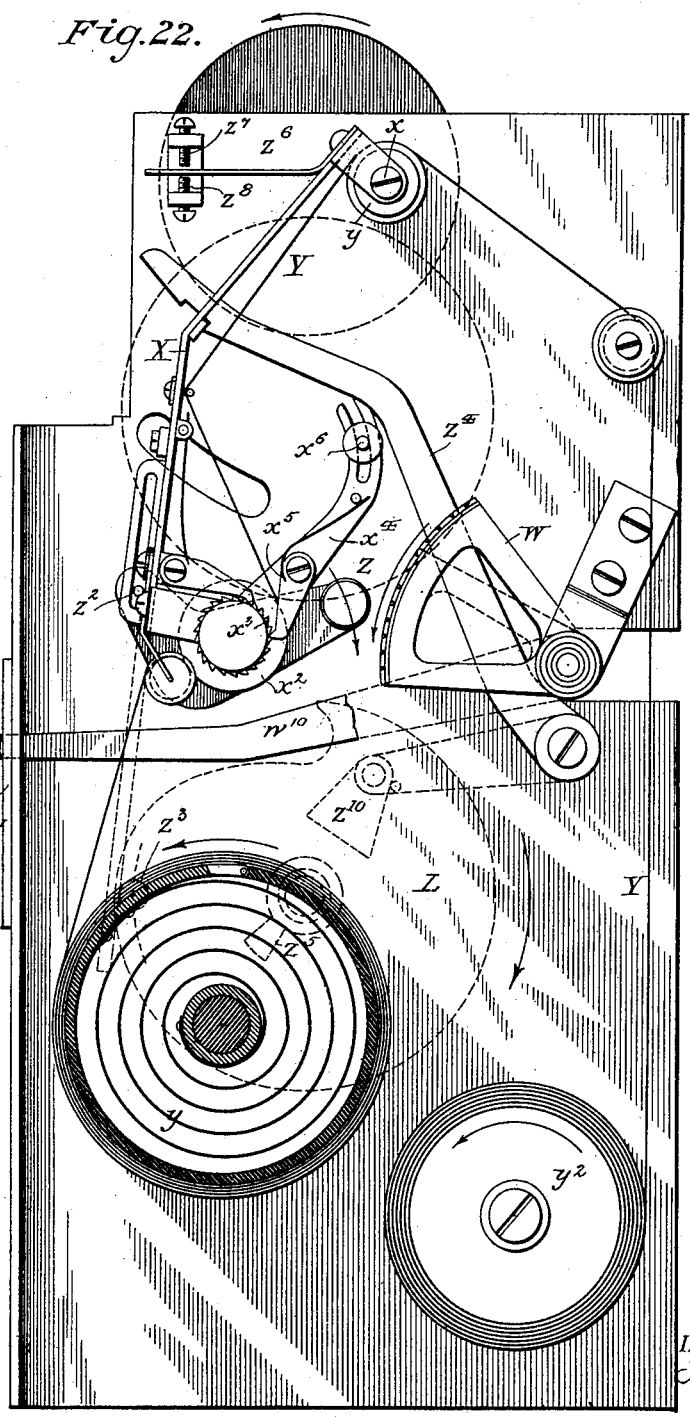

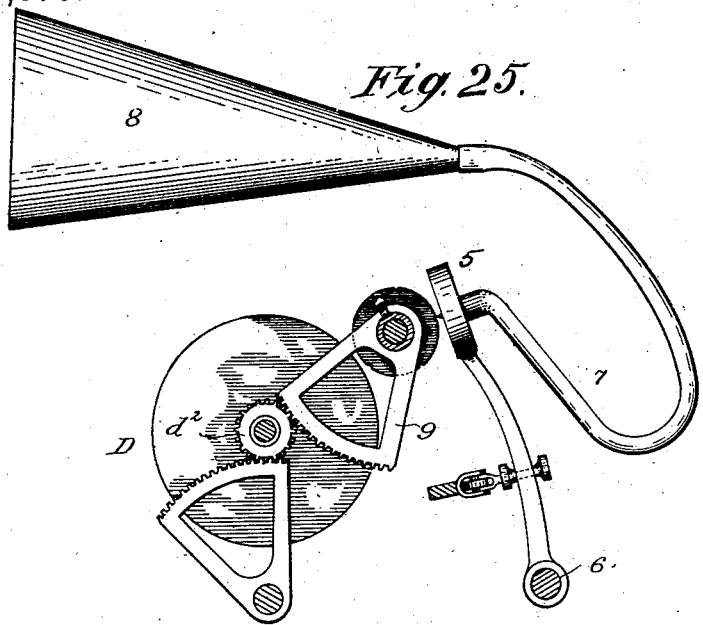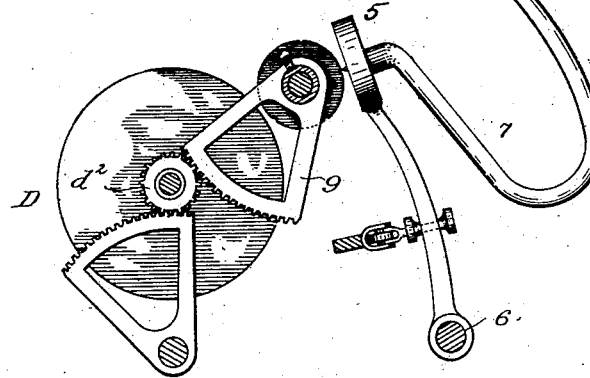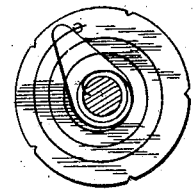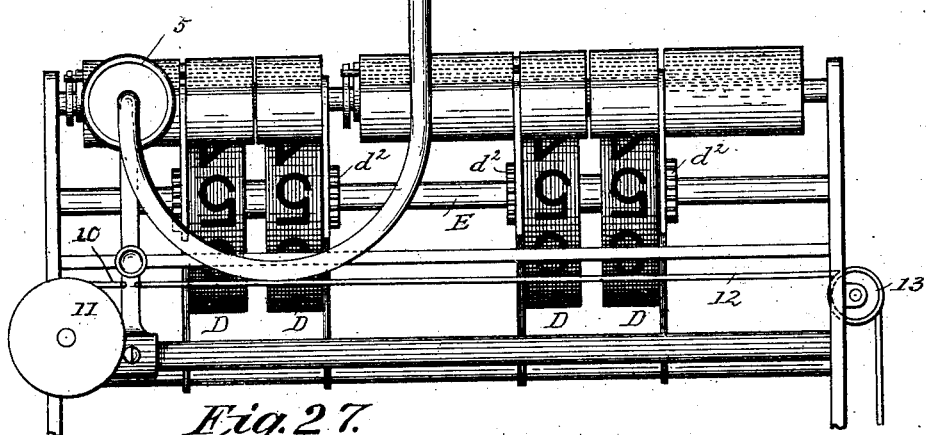

UNITED STATES PATENT OFFICE.

AUSTIN BLANCHARD HAYDEN, OF KANSAS CITY, MISSOURI, ASSIGNOR TO THE HAYDEN ARTICULATING CASH REGISTER COMPANY, OF MISSOURI.

CASH REGISTER AND INDICATOR.

SPECIFICATION forming part of Letters Patent No. 548,873, dated October 29, 1895.

Application filed May 10, 1892. Renewed September 10, 1895. Serial No. 562,113. (No model.)

*To all whom it may concern:*

Be it known that I, AUSTIN BLANCHARD HAYDEN, of Kansas City, county of Jackson, and State of Missouri, have invented a new and useful Improvement in Cash-Registers, of which the following is a specification.

My invention relates to a mechanism by which I am enabled to indicate each sale or transaction, to register the total amount of the sales, and to print a record of the individual sales in succession. I use in connection with my indicating, registering, and recording devices a series of finger-keys indicating different amounts or values, and also a movable till-cover or till with intervening devices of such character that the movement of the till or till-cover serves to actuate or impart motion to the indicating, registering, and recording devices, the finger-keys serving only to determine the extent of the movement thus imparted.

In ordinary cash-registers the finger-keys are relied upon as the means of actuating or giving motion to the indicating and registering mechanisms. It will be observed that I have made a radical departure from the ordinary organism, since my keys serve only to control or determine the extent of movement of the mechanisms which receive motion from the till or till-cover, and it is to be understood that I lay broad claim to this organization in any form of mechanical equivalent of that herein described, the details of construction and arrangement being susceptible of many modifications which will be apparent to the skilled mechanic. I also employ in my apparatus in connection with the printing or recording mechanism special keys by which I am enabled to indicate on the record-strip the department in which each sale is effected or the salesman by whom it is made or other special information.

Figure 9:
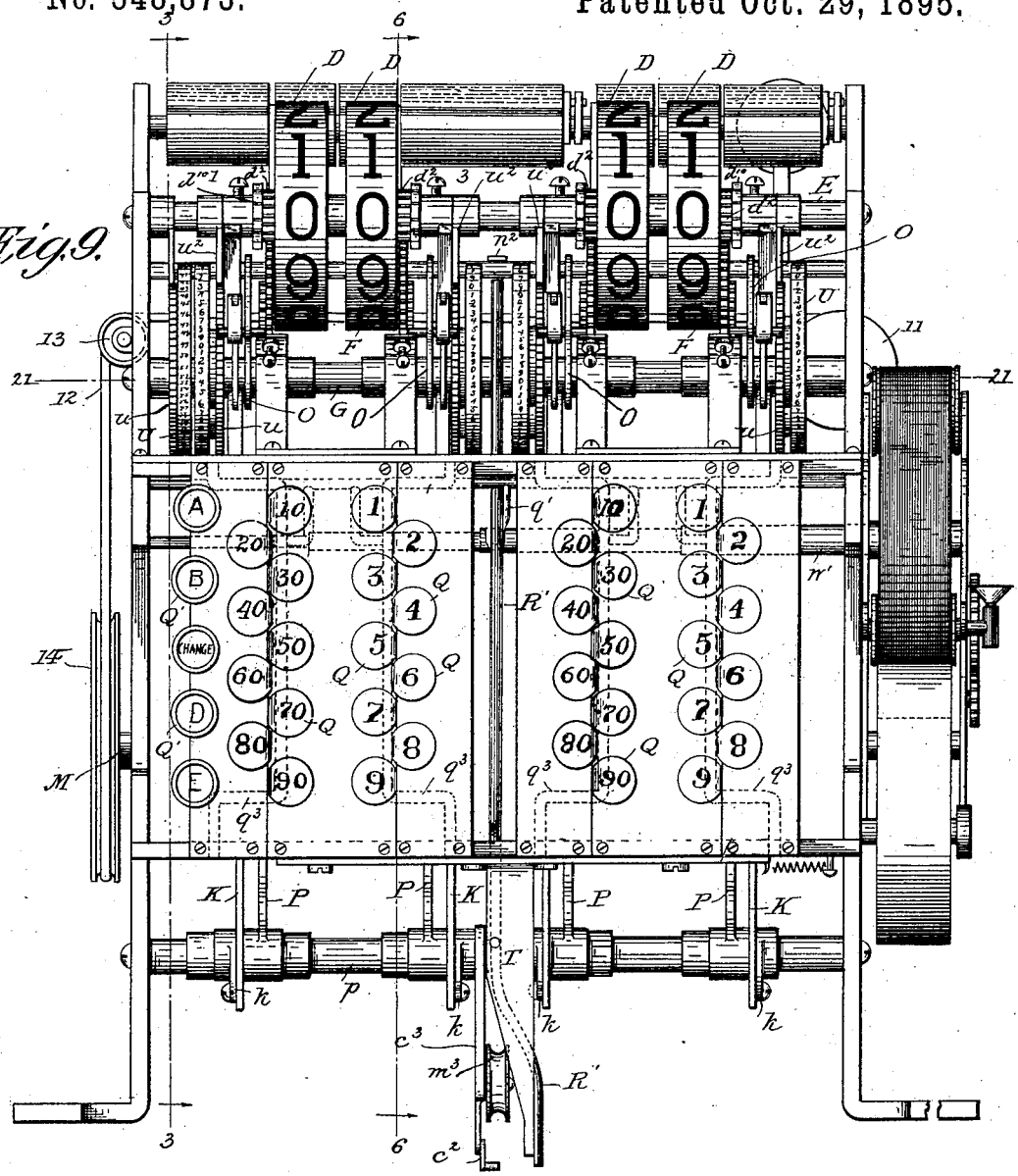
Figure 10:
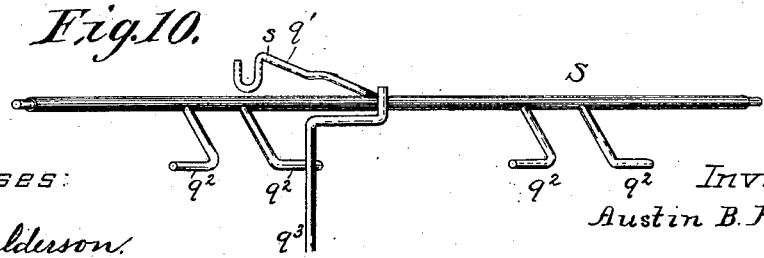
Figure 20:
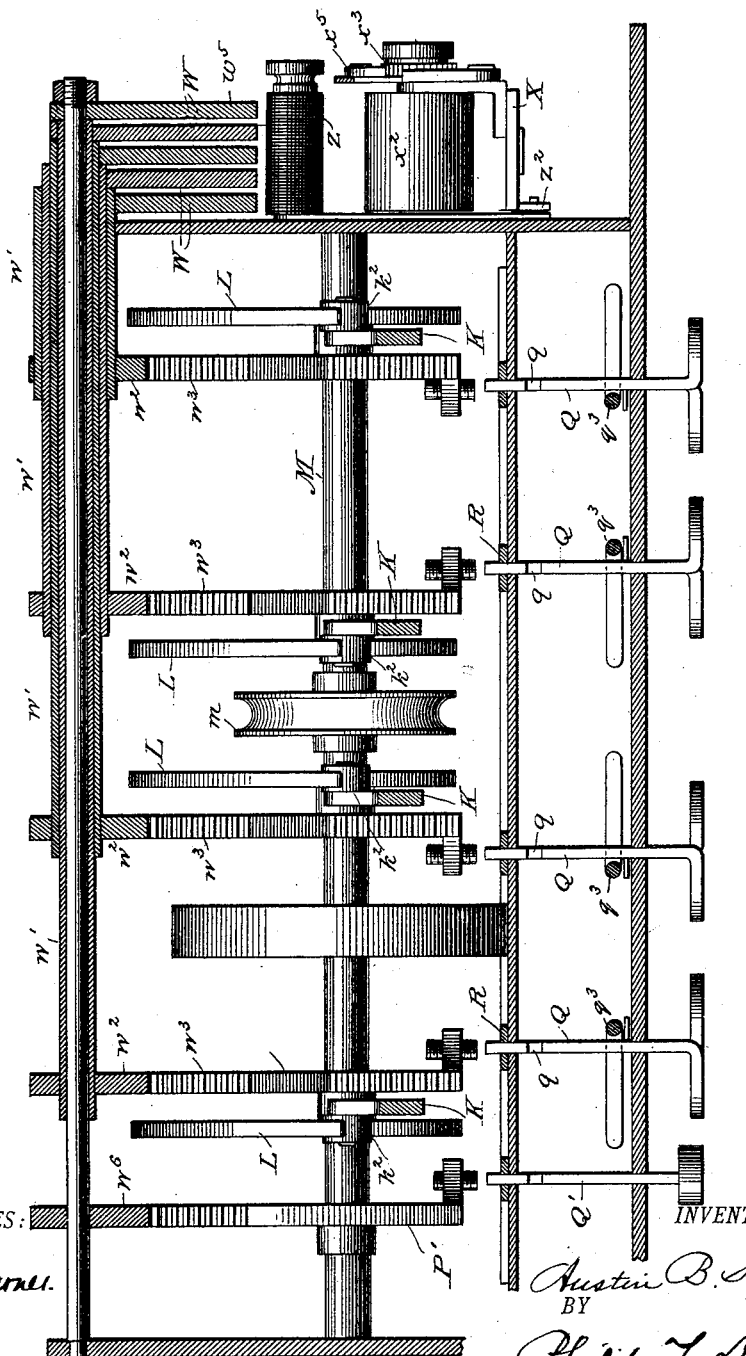
Figure 23:
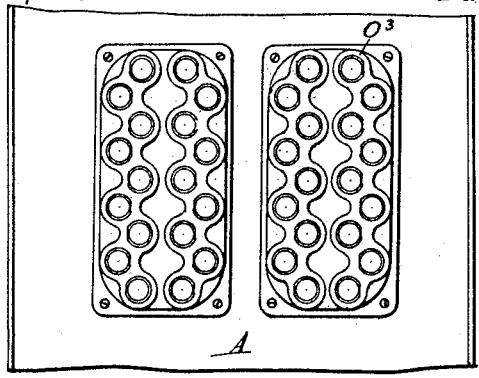
Figure 22:
Figure 21:
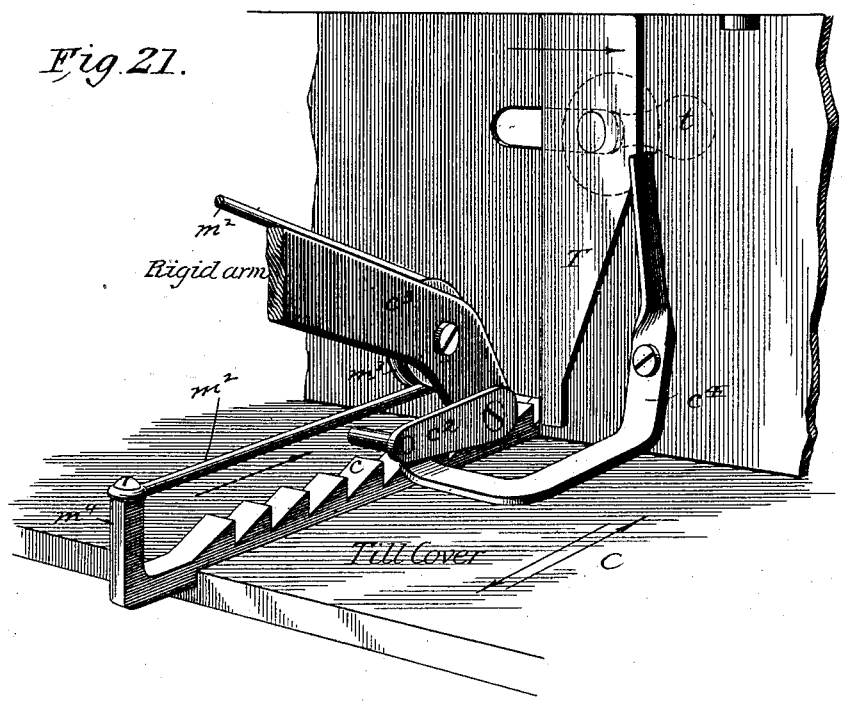

In the accompanying drawings, Figure 1 is a perspective view of my register; Fig. 2, a perspective view of part of the top with the lid open to expose the registration. Fig. 3 is a rear view showing the cams for actuating the indicating and registering mechanisms. Fig. 4 is a view of one of the finger-keys. Fig. 5 is a vertical section from front to rear on the line 6 6 of Fig. 9; Figs. 6 and 7, views of details; Fig. 8, a rear view of the mechanism with the casing removed; Fig. 9, a front view of the mechanism with the casing removed; Fig. 10, a perspective view of the rock-shaft for releasing the detaining-pawls of the indicating and registering mechanism; Fig. 11, a perspective view of one of the indicator-drums and attendant parts; Fig. 12, a perspective view showing one of the registering-wheels and attendant parts; Figs. 13 and 14, views of details; Fig. 15, a vertical section on the line 6 6 in Figs. 8 and 9, showing, on an enlarged scale, an indicating-drum and a registering-wheel and the mechanisms for actuating the same; Fig. 16, a cross-section on the line 17 17 of the preceding figure; Fig. 17, a vertical section in a plane at right angles to the plane in which Fig. 17 is taken, showing the action of the pawl which drives the indicator and register. Fig. 18 is a section on the line 19 19 of Figs. 5 and 15. Fig. 19 is a perspective view of one of the sector-arms through which the keys actuate the other parts. Fig. 20 is a horizontal section through the machine from front to rear on the line 21 of Figs. 8, 9, and 15. Fig. 21 is a perspective view of the devices for locking the till-cover and adjacent parts. Fig. 22 is an end elevation of the recording or printing mechanism. Fig. 22ª is a detail view. Fig. 23 is a face view of the finger-keys and their surrounding plates. Fig. 24 is a vertical section through the same. Fig. 25 is a vertical sectional elevation through the phonograph attachment. Fig. 26 is an elevation of the same. Fig. 27 is a longitudinal section through the reproducing-cylinders. Fig. 28 is an elevation of a detail.

Referring to the drawings, A represents a rigid external frame or casing, which may be of any form and construction adapted to sustain and inclose the operative parts hereinafter described.

B represents a till located in the forwardly-extending base of the frame and closed by a cover C, which is mounted to slide forward and backward in the frame, its backward movement serving to uncover and expose the till. While I prefer to use a movable cover, I may use a stationary cover and a movable till, it being only necessary for my purposes that one of said parts is movable in relation to the other to effect the opening and closing of the till.

D D represent a series of independent indicator-drums mounted loosely on a horizontal shaft E in the top of the frame and each carrying on the circumference ten numerals from "0" to "9," so that as the drums are revolved these numbers will be exposed one at a time through the openings $a$ in the front of the case. Each drum contains a coiled spring $d$, (indicated by broken lines in Fig. 5) and which tends to turn the drum backward and hold the same at the zero-point. On the side of each drum there is fixed a pinion $d^2$. These pinions are engaged, respectively, by toothed sector-wheels F, mounted independently of each other loosely on a horizontal shaft G. Each of these sector-wheels has formed upon its hub a sector-shaped ratchet-wheel H, as plainly shown in Figs. 16, 17, and 18, the wheels F and H being practically one. By the side of each ratchet-wheel H, I mount loosely on the shaft G an oscillating arm or lever I, carrying at its upper end a gravitating-pawl J, having a laterally-projecting stud or tooth $j$, which engages the sector-shaped ratchet-wheel H, so that when the arm I is turned in the direction indicated by the arrow in Fig. 17 its pawl J engages and turns the sector H, which, carrying with it the spur-sector F, causes the latter to turn the drum-pinion $d^2$, so as to rotate the drum D and expose one or another of its numerals at the front opening.

The pawl-carrying arm I receives motion from a vertical rod K, which is joined thereto and guided at its lower end by a link $k$, turning on a fixed pivot. Each of the pawl-actuating bars K carries, as shown more particularly in Figs. 8 and 18, a stud or roller $k^2$, which rests upon a lifting-cam L. There are four of these cams (one for each bar) fixed on a horizontal shaft M, which is mounted in the frame and provided near its middle with a drum $m$. A strap or chain $m^2$ is attached to and wound around the drum $m$ and extended thence around a stationary guide-pulley $m^3$ and finally attached to a rigid arm $m^4$, fixed to the rear edge of the till-cover C. When, therefore, the till-cover is pushed back to open the till, it causes the strap to turn the cam-shaft and cams. The cams in turn raise bars K, which, through the pawl-carriers I and connections before explained, impart the rotation to the indicator drums. Thus it will be seen that the indicating mechanism receives its motion positively from the till-cover as the latter is opened. The four lifting-cams L are so arranged on the shaft that they act successively in turning the respective indicator-drums, and this for a purpose which will hereinafter appear.

As the indicator-drums are turned forward, they are locked and held from retrograde motion by a series of pawls N, mounted on a horizontal rock-shaft $n$ and engaging ratchet-wheels $d^{10}$, rigidly mounted on the shaft E at the sides of the pinions $d^2$ of the drums, as shown in Figs. 6 and 16. These pawls are disengaged automatically when the keys are operated for a new registration, as will be hereinafter explained.

It will be observed that the pawls are thrown forward and backward through the same distance at each action, and therefore that if they were left free to engage the ratchet-wheels throughout their entire movement the indicator-drums would be turned each time to show the highest registration. I therefore provide devices actuated by the finger-keys by which the pawls may be kept out of action during the greater or less portion of the movement, according to the amount to be indicated and the distance to which the drums are to be turned. This mechanism is clearly illustrated in Figs. 5, 7, 15, 16, and 17. By on the side of each pawl-carrier I mount loosely the same shaft G an oscillating plate O, hereinafter called the "cam-plate," having near its outer edge a groove $o\ o'$, in which the pawl travels to and fro. This groove is of a length equal to twice the throw of the pawl. For half its length it lies concentric with the shaft. It is then carried downward to a decreased distance from the shaft and continued the remainder of the distance in a concentric course.

During the time that the pawl is traveling forward in the outer portion $o$ of the slot it is maintained out of engagement with the ratchet-teeth, so that it has no effect upon the indicator-drums, but on reaching the middle of the slot it rides downward into the inner or lower portion $o'$, whereby it is caused to engage and remain in engagement with the ratchet-teeth, so as to carry with it during the remainder of its movement the sector-shaped wheel H and the attendant parts for moving the drum. Now, as the duration of the pawl's action depends upon the points at which it engages the ratchet-teeth, it will be seen that by turning the cam-plate O forward or backward in relation to the sector-plate H and holding it in position during the movement of the pawl the latter may be caused to turn the drums ahead one, two, or more numbers, according to the amount to be registered. The cam-plate is turned and held for this purpose as follows: Each cam has on its lower edge a sector-pinion $o^2$ engaging teeth $o^3$ on the upper end of a bar P, mounted at its lower end on a horizontal pivot $p$ and urged forward by a spring $p^2$. In front of each bar P there is a vertical row of finger-keys Q, representing different values and mounted to slide forward and backward in the frame, their rear ends being in position to act against the bar P and push the same rearward. These keys are adapted to move rearward equal distances; but owing to the fact that they act upon the arm P at different distances from its center they move the same back different distances, so that each key acting through the bar P serves to set the cam-plate O in a special or distinctive position. Each finger-key is provided near its inner end with a notch $q$ and with a shoulder $q^7$, the latter forming a stop in connection with the key-supporting frame to limit the inward movement of the key.

Near the inner end of the tier of keys a gravitating-bar R is mounted in suitable guides and provided with shoulders or lips, so that when either key of the row is pushed inward the bar will engage in the notch $q$ and hold the key inward, so that the latter will in turn hold back the bar P and thus retain the cam-plate O in its adjusted position until after the ratchet mechanism has been actuated by the till-cover to turn the indicator-drums. Thus it will be seen that the pressing of the finger-key inward serves to set the cam O in a distinctive position corresponding with the value represented by the key, and that the key in this connection performs no other function. After the key has thus set the cam-plate the till-cover acts through intervening pawls to turn the indicator-drums, whereupon the cam O, previously adjusted by the key, serves its purpose of determining how far the drum shall be turned by the pawl, receiving motion from a source independent of the key.

As before explained, the drum is held when turned forward by the detaining-pawl N.

It will be understood that the four drums, representing, respectively, from right to left, units of cents, tens of cents, dollars, and tens of dollars, are each combined with an actuating mechanism and a series of keys, such as above described, the operation of each drum and its attendant parts being the same as the others.

As the indicator-drums D are held by the pawls N so as to continue the exposure of the registration, it becomes necessary to release the drums in the act of making a new registration, so that they may be turned by their springs to the zero-points. This is effected as follows: The shaft $n$, carrying the detaining-pawls, is provided with a forwardly-extending arm $n^2$, (see Figs. 5, 8, 9, and 11,) which lies over the upper end of a vertically-sliding rod R', seated in guides in the frame. This rod has a rear arm $r$, acted upon, as shown in Figs. 6 and 9, by the crank-arm $s$, extending rearward from a horizontal rock-shaft S. This shaft (separately shown in Fig. 10) is seated in the front of the frame and has four forwardly-extending crank-arms $q^2$, which are acted upon by four upright shafts or arms $q^3$ with cranked ends seated in the frame. Eccentric or cranked portions of these arms lie alongside of the rows of keys, and they are acted upon by pins projecting from the sides of the finger-keys Q, as shown in Figs. 5 and 20, so that whenever a key is pressed inward to effect a registration it turns the vertical shaft $q^3$, which in turn rocks the horizontal shaft S, causing its arm $s'$ to lift the rod R' and thereby throw the detaining-pawls N out of action, whereupon the indicator-drums return to their original position.

The till-cover C is provided on the upper surface with a ratchet-bar, and as the cover is pushed open a gravitating-pawl $c^2$, hung on a rigid arm $c^3$, engages teeth $c$ and holds the cover open. In order to release the cover that it may close, I provide, as shown in Figs. 5, 8, and 21, an angular lifting-lever $c^4$, pivoted to the inside of the frame, and having its upturned end in the path of a horizontal slide T, mounted in the frame, and having a protruding knob $t$, by which it may be moved. When the slide is moved to the left, the pawl $c^2$ is raised and the till-cover permitted to close under the influence of the spring-actuated strap $m^2$ or other equivalent spring-actuated devices.

It will be remembered that the keys actuated to effect an indication or registration are locked in by the gravitating-bars R. It is necessary, therefore, before a new registration to release these keys. This is effected by beveling the lower ends of the locking-bars R and arranging the slide T to pass beneath them as it unlocks the till-cover. This is plainly represented in Fig. 13.

The foregoing parts constitute a complete and operative mechanism adapted to indicate individual sales and may be used without additional parts. In order, however, that the apparatus may show the aggregate amount of the sales for a day or any other reasonable period, I propose to employ, in addition to the indicator-drums or in place thereof, a registering mechanism constructed as below described.

On the shaft G, which sustains the pawl-carriers and ratchet devices before described, I mount a series of register-wheels U, adapted to turn independently and each having on the periphery indications of value from "0" to "9," or any other suitable amount, as shown in Figs. 9 and 10. Each of these wheels is formed integrally with or attached to a ratchet-wheel $u$, having a corresponding number of teeth. The pawls J, which turn the sector-wheel for actuating the drums, have their pins or studs $j$ projected both to the right and left, so that while one end engages the sector for turning the indicator-drums, as before explained, the other end engages the ratchet-wheel $u$ for turning the register-wheel, so that the register-wheel is turned each time a distance corresponding to the distance which the indicator-drum is turned. In other words, if the drum is turned five numbers the register-wheel U is advanced five numbers. Unlike the drums, the wheels are turned constantly in one direction, being held against retrograde motion by gravitating-pawls $u^2$, (shown in Figs. 10, 11, and 15,) so that each time the indicator-drums are actuated to expose the amount of the last sale the register-wheels are advanced so as to add this amount to that already represented by them. It will of course be understood that the indicator-drums may be omitted and the register-wheels actuated by the remaining devices, the wheels receiving their motion from the till-cover and being controlled in their motion by the keys in the same manner that the drums are actuated and controlled.

As each register-wheel completes one-fifth or one-sixth of its revolution and reaches its limit of registration, it is necessary that the amount shall be "carried" over to the next higher wheel, as in other adding mechanisms. The wheels may bear any desired number of characters, and be subdivided according to any convenient system of notation, and the carrying mechanism may, of course, be constructed to operate at corresponding intervals and to a corresponding extent. The carrying is effected as follows: Each register-wheel U has formed upon or attached to it, as shown in Fig. 13, and elsewhere, a cam-wheel $u^3$, having a number of teeth or lifts in the course of its circumference. This cam-wheel acts on an arm V on a tubular sleeve $v$, mounted to turn loosely on a supporting-shaft $v^2$ and provided at the opposite end with an arm $v^3$, carrying in its turn a pawl $v^4$, which engages the ratchet-wheel of the next register-wheel. This is repeated from wheel to wheel throughout the series. As each register-wheel revolves, and whenever it has advanced ten numbers or any other predetermined distance, its cam $u^3$ actuates the arm V, causing it to draw back the pawl $v^4$ and thus release the same, whereupon the pawl, urged forward by a spring $v^5$, drives the wheel quickly ahead and advances the next register-wheel one tooth or number. This second wheel in its turn will operate through its cam and intermediate connections to advance the third wheel tooth by tooth, and so on repeatedly. As the pawls are thrown forward quickly, they will have a tendency to turn the register-wheels forward beyond the proper points. In order to prevent this and at the same time leave the register-wheels free to be turned, I mount on an independent shaft $v^6$, near each pawl-carrying arm, an angular stop-arm $v^7$. (Shown in Figs. 5, 12, and 15.) This stop-arm carries at one end a stud $v^8$, to engage and check the motion of the ratchet-wheel, while its opposite end is arranged in the path of a screw $v^9$, seated in an ear on the pawl-carrying arm. As the arm carries the pawl forward, the screw strikes the rear end of arm $v^7$ and gives the same such momentum that its stud $v^8$ is thrown up into engagement with the ratchet-wheel. The screw is so located, however, as to admit of the stop-arm falling back out of engagement before the pawl-carrying arm recedes. Thus the stop-arm is given but a momentary action.

I have hereinbefore described the manner in which the slide T is arranged to lift out of action the pawl holding the till-cover, so that the cover may close automatically. In order to avoid the necessity of holding back the slide and to insure the complete closure of the cover, I extend the arm of the slide T downward, as shown in Fig. 22, so that it may ride against the side of the rack-bar on the cover, whereby the slide will be held in the required position until the cover is closed, so that the slide may pass by the rear end of the rack-bar.

It will be understood that when the till-cover is being opened the arm lies on one side of the rack-bar and when the cover is being closed the arm is on the other side of the bar. In order to print amounts of the individual indications automatically on a record-strip, I provide mechanism hereinafter described, which may, however, be modified or replaced by any equivalent mechanism. At one end of the apparatus I mount side by side a series of sector-plates W, turning on horizontal axes and each bearing on the periphery type-numerals from "0" to "9." These type-sectors W are mounted, respectively, on the ends of horizontal telescopic shafts $w'$ $w'$, made of different lengths and extended from the rear part of the frame, as shown in Fig. 20. Each shaft carries a pinion $w^2$, and these pinions engage toothed arms $w^3$, projecting rearward from the key-actuated bars P, hereinbefore referred to.

It will be understood that there is one type-sector for each tier of keys and that whenever a key is pressed inward to effect an indication it acts through the bar P to turn a corresponding sector, so as to present at the printing-point a type or character representing the amount borne by the key. The several sectors turning independently and to different distances will present side by side in a common line the characters corresponding to those on the several keys which were actuated. Thus it is that I bring into line the type necessary to print the amount of the last sale indicated by the keys and drums.

In front of the type-sector W, I suspend the gravity arm or pendulum X on overhead pivot $x$, so that when released it will fall forward toward the type. On this arm I mount a horizontal roller $x^2$, having a ratchet-wheel $x^3$ and an arm $x^4$ with a pawl $x^5$ to engage the ratchet-wheel. The arm $x^4$ has one end slotted and arranged to straddle a fixed pin $x^6$, so that as the pendulum is vibrated the arm or lever $x^4$ is caused to turn the drum $x^2$ step by step.

A paper or other strip Y, on which to print the record, is wound on a drum $y^2$ and extended over suitable guides around the drum or roller $x^2$ on the pendulum and thence to the winding-drum $y$, which may be actuated by an internal spring or otherwise. As the pendulum swings toward the type, which are for the moment in the printing position, it will print a record on the strip. As the paper is advanced step by step by the action of roller $x^2$, the successive amounts are printed one below the other. For the purpose of inking the type I employ an ink-roller Z, carried by a swinging arm actuated by the pin $z^2$, moving in the slot in the pendulum.

This causes the ink-roller to be carried against the face of the type-sectors. The pendulum is carried backward from the type and released at the proper time by a stud $z^3$ on the side of one of the main cams L, before alluded to, as clearly shown in Fig. 22. When it is carried back, the pendulum is locked and held by an angular gravitating-latch $z^4$, which is tripped by a projection $z^5$ on the cam-shaft, as also shown in Fig. 22.

The dog $z^{10}$ is free to turn toward the left, as viewed in Fig. 22, but is prevented from turning toward the right. Therefore when the cam L turns toward the left it raises and passes the dog, but when it turns backward in the direction indicated by the arrow the projection $z^5$ engages the dog $z^{10}$ and trips the latch-lever $z^4$, releasing the impression-arm.

In order to give the pendulum additional momentum as it swings toward the type, I attach to the upper end a spring-arm $z^6$, which is put under tension by contact with an overlying stop $z^7$. As the pendulum completes its motion, the spring encounters and is put under tension by an underlying stop $z^8$, whereby the spring is caused in reacting to draw the impression-roller $x^2$ out of contact with the type at once.

I propose to use in connection with the mechanism for printing the amount mechanism to print adjacent thereto an indication of the salesman by whom the sale was made or the department in which the sale was made, or both. This is effected by providing one or more additional type-sectors $w^5$, carried by the shaft on which the sectors W are mounted, and operated by a pinion $w^6$ on the said shaft engaging a rack on an upright arm P', actuated by a row of special finger-keys Q'. The arm P' is constructed and operates in the same manner as arms P, so that when either of the special keys Q' is operated it will adjust the segment to print the appropriate matter adjacent to the amounts on the record-strip. In some cases it is desirable to have the strip adjacent to the printing mechanism, so that it may indicate all the sales made by a particular person in charge for a given time. This may be accomplished by providing a special type-sector, as shown in dotted lines in Fig. 22, with an adjusting arm or lever $w^{10}$, adapted to engage a toothed bar $w^{11}$ at the front, so as to hold a sector permanently in position until moved by hand.

In order to prevent two or more keys from being operated simultaneously, I propose to surround the keys, as shown in Figs. 23 and 24, by a fixed perforated plate $O^3$, which stands normally flush with the face of the key, so that the finger must be pushed through an opening in order to actuate the key.

I propose to use in connection with my register a phonographic attachment to announce each indication or registration after the general manner, as explained in Letters Patent No. 460,492, granted to me on the 29th day of September, 1891. The present mode of application is illustrated in Figs. 25 to 28. A series of cylinders 1, 2, and 3 are mounted to turn independently on a horizontal shaft in the top of the machine. These cylinders are provided with longitudinal parallel phonographic records representing different values and any other matter which it is desired to announce in connection therewith, so that by turning the different cylinders in relation to each other to bring into line a record of another desired combination or representing any given amount the whole record will be called off or announced.

An ordinary phonograph-reproducer 5, embracing a diaphragm and a style to travel in the record-groove, is mounted to slide to and fro on a horizontal guide-rod 6. This reproducer is connected by a flexible tube 7 with a trumpet 8 at the top of the apparatus. The record-cylinders are provided each with a toothed sector 9 engaging a pinion $d^2$ on the adjacent indicator-drum, so that when either drum is turned to expose a given amount it sets the reproducer to a corresponding position. The reproducer is moved along the cylinders in one direction, as shown in Fig. 26, by cord 10, attached to a spring-actuated winding-drum 11. It is moved in a reverse direction by a cord 12, passing over guide-pulley 13 and winding, as shown in Fig. 10, on a pulley 14 on one end of the main cam-shaft, so that when the latter is turned by the movement of the till-cover it causes the diaphragm-carriage to travel from its normal position to the opposite side of the register, the style being raised from contact with the record-cylinders by the action of the shoe, as in my previous patent. When the till-cover is released from its open position, it also releases the diaphragm-carriage, allowing the spring-drum 11, through cord 10, to return it to its normal position, causing it to announce audibly the amount indicated on the indicator-drums, both indicator-drums and impression-cylinders being at rest at this time.

Any suitable governing mechanism may be used to control the speed of the diaphragm-carriage on its return trip.

Having thus described my invention, what I claim is—

1. In a cash-register, the combination of a movable till-cover, an indicator, a pawl and ratchet mechanism actuated by the till cover and moving always the same distance to operate the indicator, a series of finger-keys representing different values, and a movable cam operated by the finger-keys to determine the point in the movement of the pawl where it shall act to move the indicator.

2. In a cash register the combination with the indicating mechanism, of a driving mechanism normally out of engagement and adapted to be thrown into action at different points in its movements, a movable member of the till, connections between said movable member and the driving mechanism for actuating the latter, a series of finger keys, and a setting mechanism adapted to be set to different positions by the respective keys of the series, to throw the driving mechanism into action, and to hold it in action until the till is fully opened.

3. In a cash register, the combination of an indicating or registering drum, a toothed sector to operate the same, a reciprocating pawl to move the sector, a movable till cover, and connections through which it reciprocates the pawl, a movable cam for throwing the pawl into and out of engagement, a series of finger keys, and connections through which the keys set the cams in different positions, whereby the pawls moving a constant distance may be caused to move the indicator a greater or a less distance at will.

4. The indicator drum, its returning spring and pinion, in combination with the driving sector, the ratchet sector, the pawl and its carrying arm I, the cam plate O, the bar P, for moving the cam plate, the finger keys acting on said bar, key locking devices and means for operating the pawl carriers by the opening and closing of the till.

5. In combination with the indicator drums and their returning springs, the till cover and its connections for turning the drums, the finger keys and their connections for limiting the rotation of the drums, the detaining pawls to prevent backward motion of the drums and pawl releasing devices connected with and actuated by the finger keys, whereby the movement of the keys to fix the limit of one registration causes the disappearance of the previous registration.

6. In combination with the indicating mechanism, a ratchet wheel connected with the same, a pawl and pawl-carrier I, the operating bar K, a cam to move said bar, a movable till cover and connections through which the till cover turns the cam; whereby a moving of the till cover is caused to impart movement positively to the indicator.

7. In a cash register the combination with the indicator drums and with the register wheels, gears for rotating said drums, pawl and ratchet mechanisms for actuating said gears and register wheels, movable cams for holding the pawls normally out of action and for throwing them into action during their forward movement, a movable member of the till and connections between the same and the pawl and ratchet mechanisms for actuating the latter, a series of finger keys, and intermediate devices adapted to be actuated by the respective keys for setting said cams to different positions.

8. In combination with the indicator drum and the ratchet sector for driving the same, the register wheel, and its ratchet wheel concentric with the ratchet sector, the intermediate driving pawl engaging both the ratchet wheel and the ratchet sector, and the adjustable cam controlling the action of the pawl; whereby the pawl is enabled to turn the indicator drum and the register wheel forward equal distances.

9. The indicator drum, its returning spring and its detaining pawl N, in combination with the register wheel, its ratchet wheel, the pawl driving both the ratchet wheel and the ratchet sector, the cam controlling the action of the pawl, a pawl to prevent retrograde motion of the register wheel, and means for throwing the drum detaining pawl out of action; whereby the indicator drum and the register wheel may be turned forward simultaneously and equally, and the indicator drum thereafter restored to its original position, while the register wheel remains to continue its rotation.

10. In combination with the indicating mechanism, the sliding till cover by which it is moved, the finger keys to control the extent of movement of the indicator, devices to lock the finger keys when actuated, the rack-bar on the till cover, the pawl to lock the cover open, and a slide T acting to release the finger keys and lift the pawl.

11. In combination with the sliding till cover, and the rack-bar thereon, the locking pawl $C^2$, its lifting lever $C^4$, and the slide T, arranged to operate the lifting lever and to engage the rack-bar; whereby the pawl is held out of action until the cover is completely closed.

12. In a cash register, the combination of the type-sectors, the finger-keys, and intermediate mechanism for setting the type sectors, the spring-actuated impression arm provided with an impression cylinder, an inking roll having connection with the impression arm whereby it is thrown against, and withdrawn from, the type-sectors, and a paper-feeding mechanism, a rotatable shaft, and means on said shaft for retracting the impression mechanism.

13. In combination with the independently adjustable type-bearing sectors W, the impression arm or striker X, and the revolving pin $z^3$, to retract said arm, the latch $z^4$, to hold the same, and a tripping device for said latch.

14. In combination with the type-bearing sectors, the swinging impression arm or striker X, the spring $z^6$, and the two stops against which it acts; whereby the striker is thrown toward the type surfaces, and thereafter withdrawn.

15. In a cash register, the combination of the type sectors, the finger keys and intermediate mechanism for setting the type sectors, a swinging impression arm, a revoluble shaft, devices thereon for retracting the impression arm, a movable till cover, and connections for revolving the shaft by the movement of the cover, and a gravity latch for holding the impression arm in retracted position.

16. In combination with the indicator drums, the phonographic record cylinders geared thereto, the longitudinally guided reproducer 5, the movable till cover, connections through which the till cover moves the reproducer in one direction, and means substantially as shown for returning the same in a reverse direction.

In testimony whereof I hereunto set my hand, this 4th day of February, 1892, in the presence of two attesting witnesses.

AUSTIN BLANCHARD HAYDEN.

Witnesses:
P. T. DODGE,
NAYMONA F. BARNES.